US008521679B2

(12) United States Patent
Churchill et al.

(10) Patent No.: US 8,521,679 B2
(45) Date of Patent: Aug. 27, 2013

(54) CLASSIFICATION RECOMMENDATION BASED ON SOCIAL ACTIONS

(75) Inventors: Elizabeth F. Churchill, San Francisco, CA (US); Jude Yew, Ann Arbor, MI (US); David Ayman Shamma, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 429 days.

(21) Appl. No.: 12/973,768

(22) Filed: Dec. 20, 2010

(65) Prior Publication Data
US 2012/0158638 A1 Jun. 21, 2012

(51) Int. Cl.
  G06F 9/44 (2006.01)
  G06N 7/02 (2006.01)
  G06N 7/06 (2006.01)
(52) U.S. Cl.
  USPC .......................................................... 706/52
(58) Field of Classification Search
  USPC .......................................................... 706/52
  See application file for complete search history.

(56) References Cited

U.S. PATENT DOCUMENTS

| | | | | |
|---|---|---|---|---|
| 7,610,563 B2* | 10/2009 | Nelson et al. | .................. | 715/839 |
| 7,707,198 B2* | 4/2010 | Weber et al. | .................. | 707/705 |
| 7,797,447 B1* | 9/2010 | Schilit et al. | .................. | 709/245 |
| 7,823,070 B2* | 10/2010 | Nelson et al. | .................. | 715/747 |
| 7,836,409 B2* | 11/2010 | Denoue et al. | ................. | 715/789 |
| 7,933,889 B2* | 4/2011 | Smetters et al. | .............. | 707/708 |
| 7,941,416 B2* | 5/2011 | Weber et al. | .................. | 707/705 |
| 8,055,673 B2* | 11/2011 | Churchill et al. | ............. | 707/767 |
| 8,131,762 B2* | 3/2012 | Smetters et al. | .............. | 707/781 |
| 8,175,922 B2* | 5/2012 | Jones et al. | ................. | 705/14.73 |
| 8,312,380 B2* | 11/2012 | Churchill et al. | ............. | 715/753 |
| 8,392,257 B2* | 3/2013 | Jones et al. | ................. | 705/14.73 |
| 8,396,874 B2* | 3/2013 | Shamma et al. | .............. | 707/741 |

OTHER PUBLICATIONS

Bawarshi, A., "The Ecology of Genre," Ecocomposition: theoretical and pedagogical approaches; pp. 69-80, 2001.
Chen, Z, et al., "Context-oriented web video tag recommendation," WWW '10: Proceedings of the 19th International Conference on World Wide Web, pp. 1079-1080, ACM, New York, NY, USA, 2010.
Cooper, M. M,, "The Ecology of Writing," College English, 48(3), pp. 364-375, 1986.
Erzberger, C. et al., "Making Inferences in Mixed Methods: The Rules of Integration," Handbook of Mixed Methods in Social and Behavioral Research, pp. 457-488, 2003.
Hölbling, G., "Content-Based Tag Generation to Enable a Tag-Based Collaborative TV-Recommendation System," EuroITV '10: Proceedings of the 8th International Interactive Conference on Interactive TV&Video, pp. 273-282, ACM, New York, NY, USA, 2010.

(Continued)

Primary Examiner — Michael B Holmes

(57) ABSTRACT

Embodiments are directed towards employing a classifier to determine a classification for target media content using nominally factored social interaction attributes, the classifier being trained using a training dataset that includes at least one nominally factored social interaction attribute. The trained classifier determines a classification of the target media content based on nominally factored social interaction attributes obtained during a monitored social interaction with the target media content and one or more users. The classification may include identifying at least one genre for the media content, as well as predicting whether the media content will go viral or not. The classification may also be used to provide recommendation to the one or more users of other media content.

20 Claims, 11 Drawing Sheets

(56) References Cited

OTHER PUBLICATIONS

Kittur, A. et al.; "Crowdsourcing User Studies Mith Mechanical Turk," CHI '08: Proceeding of the 26th Annual SIGCHI Conference on Human Factors in Computing Systems, pp. 453-456, ACM, New York, NY, USA, 2008.

"Krippendorff's Alpha—Wikipedia, the free encyclopedia," Wikipedia.com, 10 pages http://en.wikipedia.org/wiki/Krippendorffs_Alpha, accessed Jan. 28, 2011.

Liu; Y. et al., "Zync: the design of sychnronized video sharing," DUX 2007: Proceeding of the 3rd conference on Designing for User Experience, Chicago, IL, USA, 9 pages, Nov. 2007.

Mahajan, D. et al., "Image Classification Using the Web Graph," In Proceedings of the International Conference on Multi-Media, ACM, pp. 991-994, 2010.

Miller, C., "Genre as Social Action," Quarterly Journal of Speech, 70(2), pp. 151-167, 1984.

Naaman, M. et al., "Zonetag's Collaborative Tag Suggestions: What is This Person Doing in My Phone?" IEEE MultiMedia, 15(3), pp. 34-40, 2008.

Roach, M. et al., "Recent Trends in Video Analysis: A Taxonomy of Video Classification Problems," In Proceedings of the International Conference on Internet and Multimedia Systems and Applications, IASTED, 6 pages, 2002.

Salton, G. et al., "A Vector Space Model for Automatic Indexing," Communications of the ACM, 18(11):613-620, 1975.

Sen, S., et al., "tagging, communities, vocabulary, evolution," CSCW '06. Proceedings of the 2006 20th Anniversary Conference on Computer Supported Cooperative Work, pp. 181-190, ACM, New York, NY, USA, 2006.

Shamma,D. A., et al., "Spinning Online: A Case Study of Internet Broadcasting by DJs," C&T '09: Proceedings of the 4th International Conference on Communities and Technologies, pp. 175-184, ACM, New York, NY, USA, 2009.

Shamma, D. A. et al., "Social Interactive Television: Immersive Shared Experiences and Perspectives," chapter Zync with Me: Synchronized Sharing of Video through Instant Messaging, pp. 269-284, Information Science Publishing, Hershey, PA, USA, 2009.

Slaney, M. et al., "Similarity Based on Rating Data," Proceeding of International Symposium on Music Information Retrieval, Citeseer, 6 pages, 2007.

Weinberger, K. Q. et al. "Resolving Tag Ambiguity," MM '08: Proceeding of the 16th ACM International Conference on Multimedia, pp. 111-119, ACM, New York, USA, 2008.

Weisz, J. D. et al, "Watching Together: Integrating Text Chat with Video," CHI '07: Proceedings of the SIGCHI conference on human factors in computing systems, pp. 877-886, ACM Press, New York, NY, USA, 2007.

Wesler, H. T. et al., "Distilling Digital Traces: Computational Social Science Approaches to Studying the Internet," The Sage Handbook of Online Research Methods, N. Fielding, R. M. Lee, and G. Blank, editors, pp. 116-140, Sage, London, 2008.

Yew, J. et al., "Know Your Data: Understanding Implicit Usage versus Explicit Action in Video Content Classification," Proceeding IS&T/SPIE Symposium on Electronic Imaging: Science & Technology, SPIE, 8 pages, Jan. 2011.

Zhang, N. et al., "A Tag Recommendation System for Folksonomy," SWSM '09: Proceeding of the 2nd ACM workshop on Social Web Search and Mining, pp. 9-16, ACM, New York, NY, USA, 2009.

Shamma, D. A., et al., "Watch What I Watch: Using Community Activity to Understand Content," in MIR '07: Proceedings of the International Workshop on Multimedia Information Retrieval, pp. 275-283, ACM, New York, NY, USA, 2007.

Crane, R. et al., "Viral, Quality, and Junk Videos on YouTube: Separating Content From Noise in an Information-Rich Environment," in Proceeding of AAAI symposium on Social Information Processing, Menlo Park, CA, 3 pages, 2008.

Szabo, G. et al "Predicting the Popularity of Online Content," Communcations, ACM, 53(8), pp. 80-88, 2010.

Larsen, K., "Generalized Naive Bayes Classifiers," SIGKDD Explorations Newsletter, 7(1), pp. 76-81, 2005.

Lowd, D. et al., "Naive Bayes Models for Probability Estimaiton," in ICML '05: Proceedings of the 22nd International Conference on Machine Learning, pp. 529-536, ACM, New York, NY, USA, 2005.

Caruana, R. et al., "An empirical comparison of supervised learning algorithms," in ICML '06: Proceedings of the 23rd International Conference on Machine learning, pp. 161-168, ACM, New York, NY, USA, 2006.

Domingos, P. et al., "On the Optimality of the Simple Bayesian Classifier under Zero-One Loss," Machine Learning, 29 (2-3), Kluwer Academic Publishers, pp. 103-130, 1997.

Rish, I. et al, "An analysis of data characteristics that affect naive Bayes performance," Tech. Rep. RC21993, IBM, 8 pages, 2001.

Herlocker, J. et al., "Explaining Collaborative Filtering Recommendations," in ACM 2000 Conference on Computer Supported Cooperative Work, pp. 241-250, Association of Computing Machinery, Dec. 2000.

Arceneaux, K., "The Remix as Cultural Critique: The Urban Contempoary Music Video," Popular Music and Society, 16(3), pp. 109-124, 1992.

\* cited by examiner

CLASSIFICATION RECOMMENDATION BASED ON SOCIAL ACTIONS

TECHNICAL FIELD

The present invention relates generally to media content and, more particularly, but not exclusively to recommending a classification of media content based on in part on monitored social activities with to the media content.

BACKGROUND

The expansion of the internet and the declining cost of digital content creation have spawned a new epidemic of sharing, using, and experiencing media content. Today, socially sharing videos has become a very popular activity. Thus, users are constantly looking for additional media content to share and experience. However, due to the vast amounts of media content available, it may sometimes be difficult for users to locate media content that may be of interest to them. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
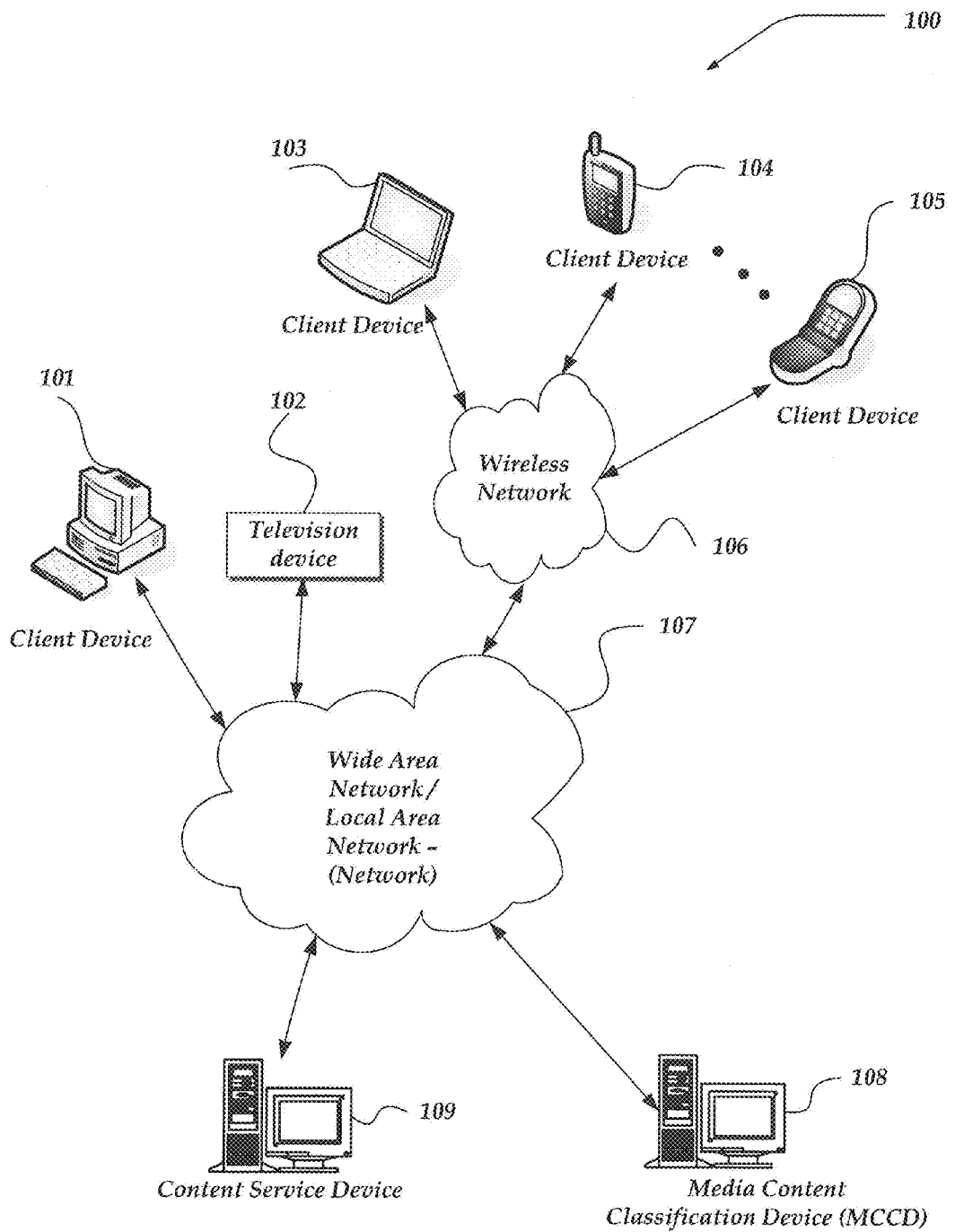
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "media content" refers to any digital data useable by a computing device including textual, graphical, and/or audio content. Media content may include video, images, animation, audio files, texts, instant messages, emails, documents, or the like. However, media content may also include content within a web page, including, without limit, blog pages, news articles, educational articles, advertisements, any virtually any other digital data that may be posted to a website, or otherwise accessible over a network.

As used herein, the term "social activity" refers to an interaction between one or more users, an interaction between one or more users and media content, and/or an interaction between one or more users about media content. Social activity may therefore by any action performed by a user in relation to media content, including, without limit, viewing media content, rating media content, leaving a comment about media content, chatting about media content, sharing media content control, accessing media content, posting media content to a website, or the like.

As used herein, the phrase "synchronous social activity" refers to any social activity in a shared environment, where a user interacts with another user while concurrently experiencing and/or otherwise interacting with media content. Synchronous social activity may include, without limit, chatting about media content, sharing media content control, or the like.

As used herein, the phrase "asynchronous social activity" refers to any social activity where a first user interacts with the media content independent from a second user's interaction with the media content and the first user. Asynchronous social activity may include individually viewing media content, rating media content, leaving a comment, posting media content, or virtually any other activity performed by one user with respect to the media content absent any concurrent interaction with other users and the media content.

As used herein, the phrase "social interaction attribute" refers to any data that is generated from the media content itself and/or from social activities corresponding to the media content. A social interaction attribute may include, for example, a number of scrub commands (e.g. fast forward or rewind), a number of play commands, a number of pause commands, a number of characters, a number of words, a number of emoticons, a number of user views, a social activity session duration, a media content duration, a user generated rating, user generated comments, or the like. However, other attributes may also be included. Further, social interaction attributes are not to be construed as being limited by a particular type, or format of media content.

As used herein, the term "implicit usage" refers to social interaction attributes that are generated as a result of a user's interaction with media content. Non-limiting examples of implicit usage include visiting, viewing, reading, or otherwise accessing media content. Implicit usage may also include a number of scrub commands (e.g. fast forward or rewind), a number of play commands, a number of pause commands, a social activity session duration, a media content duration, a number of user views, or the like.

As used herein, the term "explicit actions" refers to social interaction attributes that are expressions or responses from a user about the media content. Explicit actions may include, for example, a user's generated rating, a user's generated comments, a number and/or type of emoticons used about the media content, or the like.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated the present invention is directed towards employing a classifier to determine a classification of media content using at least one nominally factored social interaction attribute. In one embodiment, the social interaction attribute may include a plurality of social interaction attributes, including the at least one nominally factored social interaction attribute. In one embodiment, the social interaction attribute(s), may be obtained during any of an asynchronous social activity, a synchronous social activity, or through a combination of synchronous social and asynchronous social activities associated with the media content and one or more users. In one embodiment, the classification may include a genre for the media content. However, the invention is not constrained to providing a single classification for the media content. For example, in another embodiment, the classification could include two or more classes for which the media content may be identified, a hierarchy of classes, or any of a similar arrangement of multiple classes.

In another embodiment, the classification may also include a prediction of whether the media content will "go viral" over a network. That is, a prediction of the popularly or interest in the media content may also be provided. In one embodiment, based on the determined classification of the media content, a recommendation about other media content may be provided to one or more users involved in the social activities associated with the media content.

In another embodiment, the classification may be employed as a label, or tag, for the media content, useable to improve searching, sorting, or otherwise managing media content. Thus, the present invention is directed towards enabling classification of media content to be performed without requiring users to directly tag, label, or otherwise classify the media content. Instead, social interactions are monitored during user interactions with the media content (and possibly other users) and then such social interactions are employed to automatically (without additional user input) classify the media content.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")–(network) 107, wireless network 106, client devices 101-105, content service device 109, and Media Content Classification Device ("MCCD") 108.

One embodiment of client devices 101-105 is described in more detail below in conjunction with FIG. 2. Generally, however, client devices 103-105 may include virtually any portable computing device capable of receiving and sending a message over a network, such as network 107, wireless network 106, or the like. Client devices 103-105 may also be described generally as client devices that are configured to be portable. Thus, client devices 103-105 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 103-105 typically range widely in terms of capabilities and features. In one non-limiting example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including social networking information, performing various online activities, or the like. The set of such devices may include devices that typically connect using a wired or wireless communications medium such as personal computers, multiprocessor systems, microprocessor-based or programmable consumer electronics, network PCs, or the like. In one embodiment, at least some of client devices 102-104 may operate over wired and/or wireless network. Client device 102 may include virtually any device useable as a television device. Today, many of these devices include a capability to access and/or otherwise communicate over a network such as network 107 and/or even wireless network 106. Moreover, client device 102 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to perform various activities over a network (online). However, another application may also be used to perform various online activities.

Client devices 101-105 also may include at least one other client application that is configured to receive and/or send content, including social activities, between another computing device. The client application may include a capability to provide and receive media content, textual content, graphical content, audio content, and the like. Such social activities may include, but are not limited to asynchronous and/or synchronous social activities associated with media content.

The client application may further provide information that identifies itself, including a type, capability, name, and the like. In one embodiment, client devices 101-105 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a network packet, or the like, sent between other client devices, content service device 109, MCCD 108, or other computing devices.

Client devices 101-105 may further be configured to include a client application that enables an end-user to log into an end-user account that may be managed by another computing device, such as content service device 109, MCCD 108, or the like. Such end-user account, In one non-limiting example, may be configured to enable the end-user to manage one or more online activities, including In one non-limiting example, search activities, social networking activities, browse various websites, make purchases, sell products/services, communicate with other users, or share attachments with others, or the like. However, participation in such online networking activities may also be performed without logging into the end-user account.

Moreover, client devices 101-105 may be configured to operate to send messages, and other user generated comments for posting through and/or on a content service device, such as 109. That is, in one embodiment, a user of client devices 101-105 may create and/or otherwise post user generated comments regarding media content within a blog, webpage, or the like, hosted by one or more of content service device 109.

Wireless network 106 is configured to couple client devices 103-105 and its components with network 107. Wireless network 106 may include any of a variety of wireless sub-networks that may further overlay stand-alone ad-hoc networks, and the like, to provide an infrastructure-oriented connection for client devices 103-105. Such sub-networks may include mesh networks, Wireless LAN (WLAN) networks, cellular networks, and the like. In one embodiment, the system may include more than one wireless network.

Wireless network 106 may further include an autonomous system of terminals, gateways, routers, and the like connected by wireless radio links, and the like. These connectors may be configured to move freely and randomly and organize themselves arbitrarily, such that the topology of wireless network 106 may change rapidly.

Wireless network 106 may further employ a plurality of access technologies including 2nd (2G), 3rd (3G), 4th (4G) generation radio access for cellular systems, WLAN, Wireless Router (WR) mesh, and the like. Access technologies such as 2G, 3G, 4G and future access networks may enable wide area coverage for mobile devices, such as client devices 103-105 with various degrees of mobility. In one non-limiting example, wireless network 106 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 106 may include virtually any wireless communication mechanism by which information may travel between client devices 103-105 and another computing device, network, and the like.

Network 107 is configured to couple network devices with other computing devices, including, content service device 109, MCCD 108, client devices 101 and 102, and through wireless network 106 to client devices 103-105. Network 107 is enabled to employ any form of computer readable media for communicating information from one electronic device to another. Also, network 107 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In one embodiment, network 107 may be configured to transport information of an Internet Protocol (IP). In essence, network 107 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Content service device 109 includes virtually any network device usable to operate as website servers to provide content, including, media content, to client devices 101-105. Such content may include, but is not limited to textual, graphical, and/or audio content, and/or any of a variety of media content for access by, or any of a variety of other interactions with the media content by, another client device. Content service device 109 may also operate as a messaging server such as an SMS message service, IM message service, email message service, alert service, or the like. Moreover, content service device 109 may also operate as a File Transfer Protocol (FTP) server, a database server, music and/or video download server, or the like. Additionally, content service device 109 may be configured to perform multiple functions.

One embodiment of MCCD 108 is described in more detail below in conjunction with FIG. 3. Briefly, however, MCCD 108 may include any computing device capable of connecting to network 107 to determine a classification for target media content using nominally factored social interaction attributes, the classifier being trained using a training dataset that includes at least one nominally factored social interaction attribute. The training of the classifier is described in more detail below.

In one embodiment, MCCD 108 may detect, receive, or otherwise monitor communications about target media content. Such communications may include, but are not limited to interactions with the media content and one or more client devices 101-105. The communications may include, for example, social actions by a single client device, and/or social actions between one or more client devices and the target media content. Further, such communications may include content services 109 and one or more client devices 101-105.

During or otherwise based on the communications, MCCD 108 may obtain a plurality of target media content variables that map to one or more social interaction attributes that are obtained from the social actions. In one embodiment, MCCD 108 may then nominally factor at least one of the plurality of target media content variables. MCCD 108 may then determine a classification for the target media content by providing to a classifier the plurality of target media content variables, including the nominally factored target media content variable.

In one embodiment, MCCD 108 may provide the determined classification to client device 101-105. In one embodiment, the classification may include a genre classification of the target media content. In another embodiment, the classification may be employed by MCCD 108 to provide to one or more client devices associated with the communication, a recommendation of other media content. In still another embodiment, MCCD 108 might further provide an indication of whether, based on the classification, the target media content is predicted to become popular such that it may be considered to "go viral."

However, use of the classification is not limited to the above, and other applications may also use the classification, including, tagging or labeling the target media content such that searches, sorting, or other management related actions of the target media content may be performed.

Devices that may operate as content service device 109, and/or MCCE 108, include various network devices, including, but not limited to personal computers, desktop computers, multiprocessor systems, microprocessor-based or programmable consumer electronics, network PCs, server devices, network appliances, and the like.

Although FIG. 1 illustrates MCCD 108 as a single computing device, the invention is not so limited. For example, one or more functions of the MCCD 108 may be distributed across one or more distinct network devices. Further, while MCCD 108 illustrates a network device useable to determine a classification, distinct from displaying such results, the invention is not so limited. Thus, in one embodiment, one or more functions of content service device 109 may also be performed by MCCD 108.

Moreover, MCCD 108 is not limited to a particular configuration. Thus, in one embodiment, MCCD 108 may contain a plurality of network devices to perform the classification determination. Similarly, in another embodiment, MCCD 108 may contain a plurality of network devices that operate using a master/slave approach, where one of the plurality of network devices of MCCD 108 operates to manage and/or otherwise coordinate operations of the other network devices. In other embodiments, the MCCD 108 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
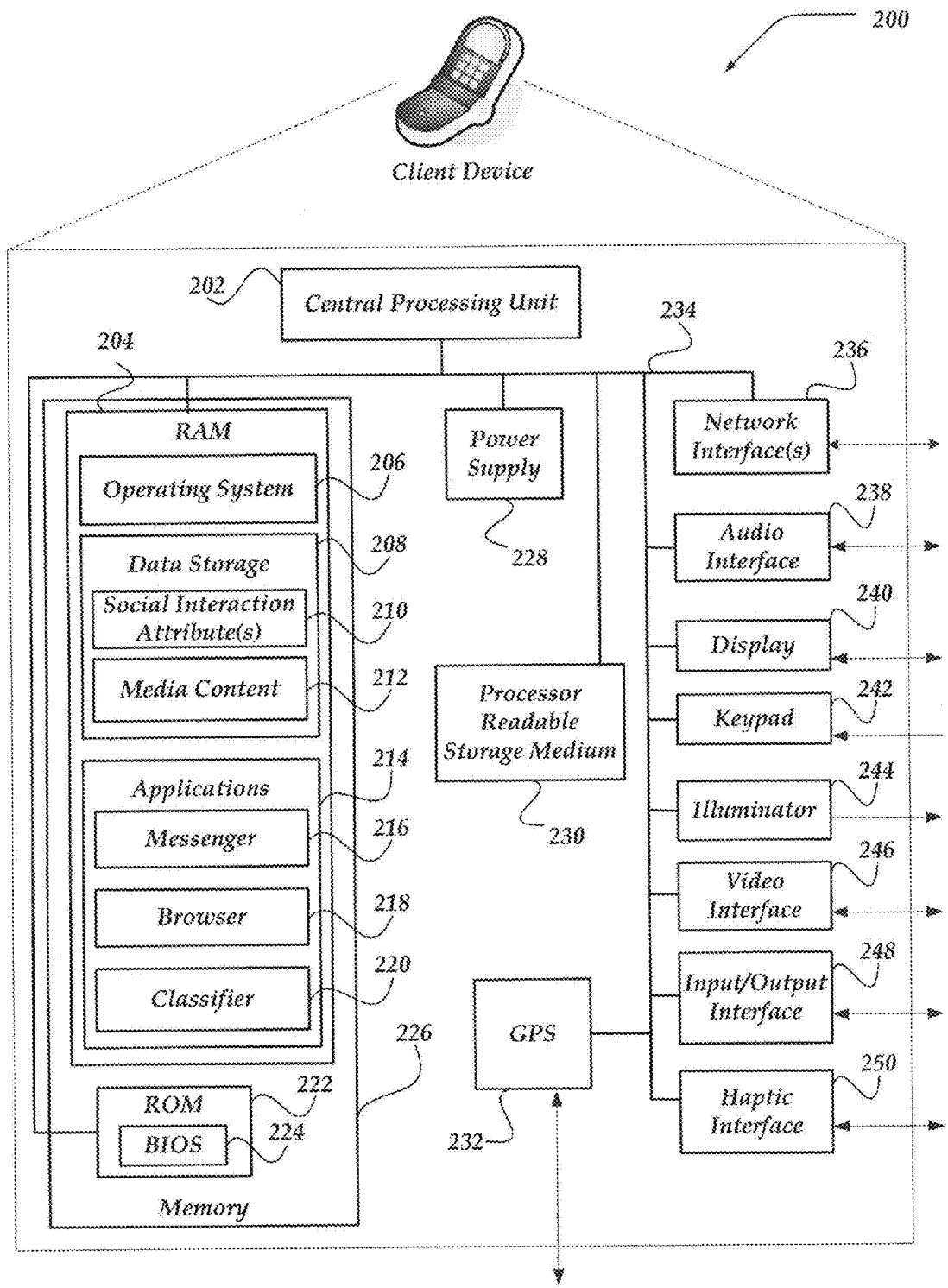
FIG. 2 shows an embodiment of a client device that may be included in a system such as that shown in FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-105 of FIG. 1.

As shown in the figure, client device 200 includes a processing unit (CPU) 202 in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, and an optional global positioning systems (GPS) receiver 232. Power supply 228 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 236 is sometimes known as a transceiver, transceiving device, or network interface card (NIC).

Audio interface 238 is arranged to produce and receive audio signal s such as the sound of a human voice. For example, audio interface 238 may be coupled to a speaker and microphone (not shown) to enable telecommunication with others and/or generate an audio acknowledgement for some action. Display 240 may be a liquid crystal display (LCD), gas plasma, light emitting diode (LED), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images. Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

Optional GPS transceiver 232 can determine the physical coordinates of client device 200 on the surface of the Earth, which typically outputs a location as latitude and longitude values. GPS transceiver 232 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a MAC address, IP address, or the like.

Mass memory 226 includes a RAM 204, a ROM 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, as illustrated, data storage 208 may also store messages, web page content, or any of a variety of user generated content. At least a portion of the information may also be stored on a disk drive or other computer-readable storage device (not shown) within client device 200.

Data storage 208 may further store media content 212 and/or social interaction attributes 210. Media content 212 may include a training media content corpus, which is a collection of media content. In one embodiment, the media content may include only the content itself. In another embodiment, the media content may include metadata corresponding to social interaction attributes.

Social interaction attributes 210 may include a plurality of training media content datasets mapped to a plurality of social interaction attributes about synchronous and/or asynchronous social activity. Similarly, social interaction attributes 210 may include a plurality of target media content variables mapped to a plurality of social interaction attributes about synchronous and/or asynchronous social activity.

Applications 214 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. Applications 214 may include, for example, messenger 216, browser 218, and classifier 220.

Browser 218 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. However, any of a variety of other web-based languages may be employed. In one embodiment, browser 218 may enable a user of client device 200 to provide and/or receive user generated content including messages and/or other documents between another computing device for posting, reading, and/or otherwise communicating with another client device.

Messenger 216 may be configured to manage a messaging session using any of a variety of messaging communications including, but not limited to email, Short Message Service (SMS), Instant Message (IM), Multimedia Message Service (MMS), internet relay chat (IRC), mIRC, RSS feeds, and/or the like. For example, in one embodiment, messenger 216 may be configured as an IM application, such as AOL Instant Messenger, Yahoo! Messenger, .NET Messenger Server, ICQ, or the like. In one embodiment, messenger 216 may be configured to include a mail user agent (MUA) such as Elm, Pine, MH, Outlook, Eudora, Mac Mail, Mozilla Thunderbird, or the like. In another embodiment, messenger 216 may be a client application that is configured to integrate and employ a variety of messaging protocols, including, but not limited to various push and/or pull mechanisms for client device 200. In one embodiment, messenger 216 may interact with browser 218 for managing messages. As used herein, the term "message" refers to any of a variety of messaging formats, or communications forms, including but not limited to email, SMS, IM, MMS, IRC, or the like.

Classifier 220 is configured to employ a classifier to determine a classification for target media content using nominally factored social interaction attributes, the classifier being trained using a training dataset that includes at least one nominally factored social interaction attribute. In one embodiment, Classifier 220 may be an optional component within client device 200. For example, a classifier hosted on another network device may be employed to perform the classification of media content.

In any event, classifier 220 may retrieve a plurality of training media content datasets, nominally factor at least one of the plurality of training media content datasets, and train a classifier with the plurality of training media content datasets. Additionally, classifier 220 may be configured to obtain a target media content and determine a classification for the target media content using the trained classifier.

In one embodiment, the plurality of training media content datasets may be received by a single one of classifier 220, which may then distribute the training media content datasets across other network devices similar to client device 200 having similar classifiers 220, such that the distributed training media content datasets my be operated on substantially in parallel to provide nominally factored training media content datasets. The training media content datasets may then be sent to a single network device, such that the classifier is trained using the training media content datasets.

In one embodiment, the classifier is trained on one client device. Once trained, the classifier may be distributed to a plurality of other network devices similar to client device 200 having similar classifiers 220, such that the trained classifiers determine a classification for target media content independent of the other network devices. In any event, classifier 220 may employ processes similar to those described below in conjunction with FIGS. 4-11 to perform at least some of its actions.

Illustrative Network Device

Figure 3:
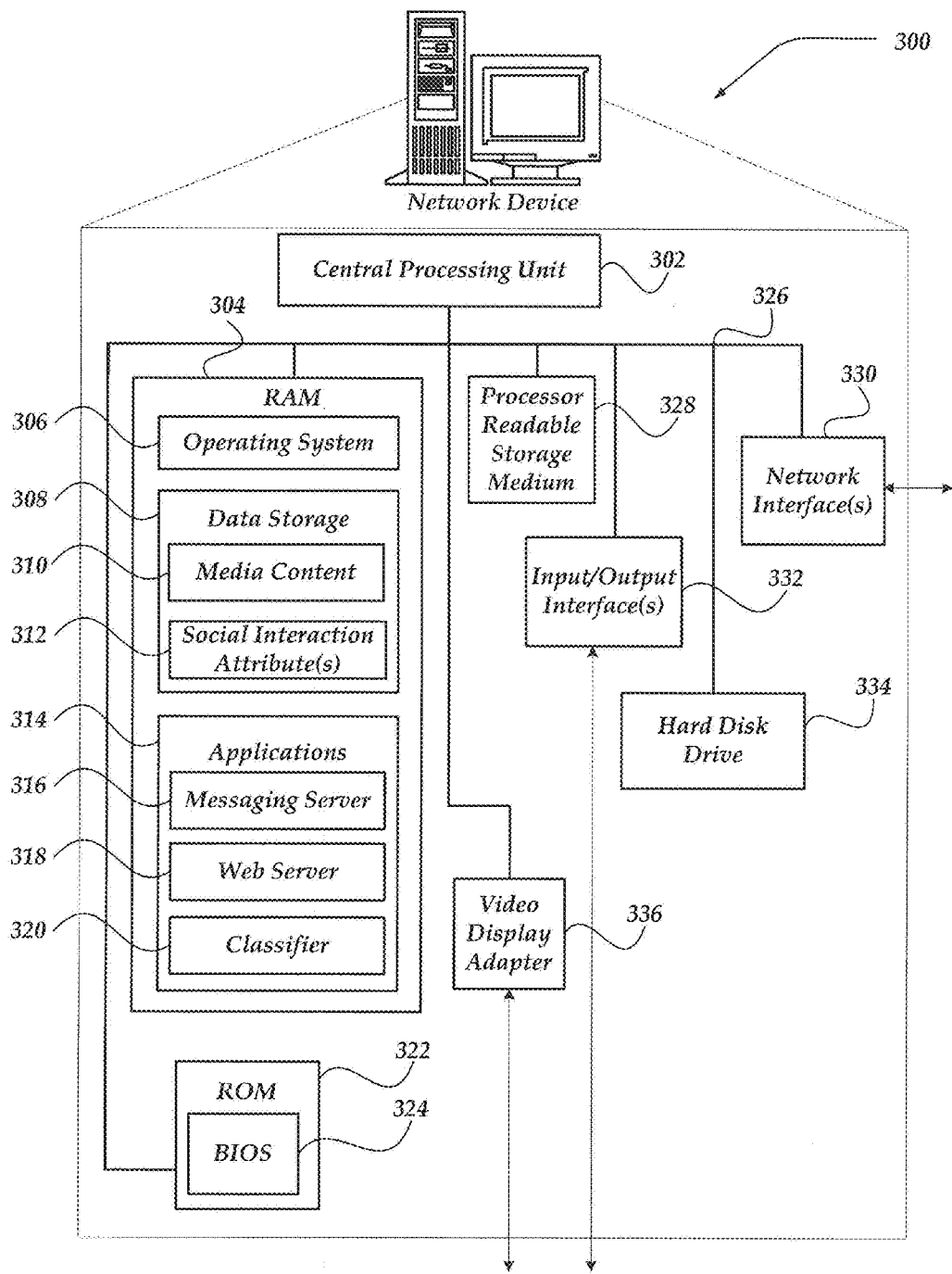
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, or any other device. Network device 300 may represent, for example MCCD 108, content service device 109 of FIG. 1, or a combination of MCCD 108 and content service device 109.

Network device 300 includes processing unit 302, video display adapter 336, and a mass memory, all in communication with each other via bus 322. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. Basic input/output system ("BIOS") 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

The mass memory as described above illustrates another type of computer-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as central processing unit (CPU) 302 to execute and perform actions. In one embodiment, at least some of data store 308 might also be stored on another component of network device 300, including, but not limited to processor readable storage medium 328, hard disk drive 334, or the like. Data storage 308 may further store media content 310 and/or social interaction attributes 312.

Media content 310 may include a training media content corpus, which is a collection of media content. In one embodiment, the media content may include only the content itself. In another embodiment, the media content may include metadata corresponding to social interaction attributes.

Social interaction attributes 312 may include a plurality of training media content datasets mapped to a plurality of social interaction attributes about synchronous and/or asynchronous social activity. Similarly, social interaction attributes 312 may include a plurality of target media content variables mapped to a plurality of social interaction attributes about synchronous and/or asynchronous social activity.

The mass memory also stores program code and data. One or more applications 314 are loaded into mass memory and run on operating system 306. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth. Messaging server 316, web server 318, and classifier 320, may also be included as application programs within applications 314.

Messaging server 316 may include virtually any computing component or components configured and arranged to forward messages from message user agents, and/or other message servers, or to deliver messages to a local message store, such as data storage 308, or the like. Thus, messaging server 316 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like. Messaging server 316 may also be managed by one or more components of messaging server 316. Thus, messaging server 316 may also be configured to manage SMS messages, IM, MMS, IRC, RSS feeds, mIRC, or any of a variety of other message types. In one embodiment, messaging server 316 may enable users to initiate and/or otherwise conduct chat sessions, VOIP sessions, or the like.

In one embodiment, messaging server 316 may receive media content from another network device, such as a client device, or the like. Messaging server 316 may then enable the network device to share media content with another network device. Messaging server 316 may provide the media content, a media content platform for interacting with the media content, or the like.

Web server 318 represent any of a variety of services that are configured to provide content, including messages, over a network to another computing device. Thus, web server 318 includes, for example, a web server, a File Transfer Protocol (FTP) server, a database server, a content server, or the like. Web server 318 may provide the content including messages over the network using any of a variety of formats including, but not limited to WAP, HDML, WML, SMGL, HTML, XML, cHTML, xHTML, or the like.

Classifier 320 operates substantially similar to classifier 220 of FIG. 2, as described above. However, in one embodiment, classifier 320 may be configured to operate over a plurality of communications between one or more client devices to employ a classifier to determine a classification for target media content for a communication using nominally factored social interaction attributes, the classifier being trained using a training dataset that includes at least one nominally factored social interaction attribute.

In one embodiment, classifier 320 may be configured to retrieve a plurality of training media content datasets, nominally factor at least one of the plurality of training media content datasets, and training a classifier with the plurality of training media content datasets. Additionally, classifier 320 is configured to obtain a target media content and determine a classification for the target media content using the train classifier.

In one embodiment, the plurality of training media content datasets may be received by a single one of classifier 320, which may then distribute the training media content datasets across the other network devices similar to network device 300 having similar classifiers 320, such that the distributed training media content datasets my be operated on substantially in parallel to provide nominally factored training media content datasets. The training media content datasets may then be sent to a single network device, such that the classifier is trained using the training media content datasets. In any event, classifier 320 may perform actions such as those described below in conjunction with FIGS. 4-11.

In one embodiment, classifier is trained on one network device. Once trained the classifier may be distributed to a plurality of other network devices similar to network device 300 having similar classifiers 320, such that the trained classifiers determine a classification for target media content independent of the other network devices.

In some embodiments, network device 300 may contain a training media content corpus, including the plurality of training media content datasets mapped to a plurality of social interaction attributes about asynchronous social activity. In other embodiments, network device 300 may contain a training media content corpus, including the plurality of training media content datasets mapped to a plurality of social interaction attributes about synchronous social activity.

In some embodiments, network device 300 may contain a target media content, including a plurality of training media content variables mapped to a plurality of social interaction attributes about asynchronous social activity. In other embodiments, network device 300 may contain a target media content, including the plurality of target media content variables mapped to a plurality of social interaction attributes about synchronous social activity.

General Operation

Figure 4:
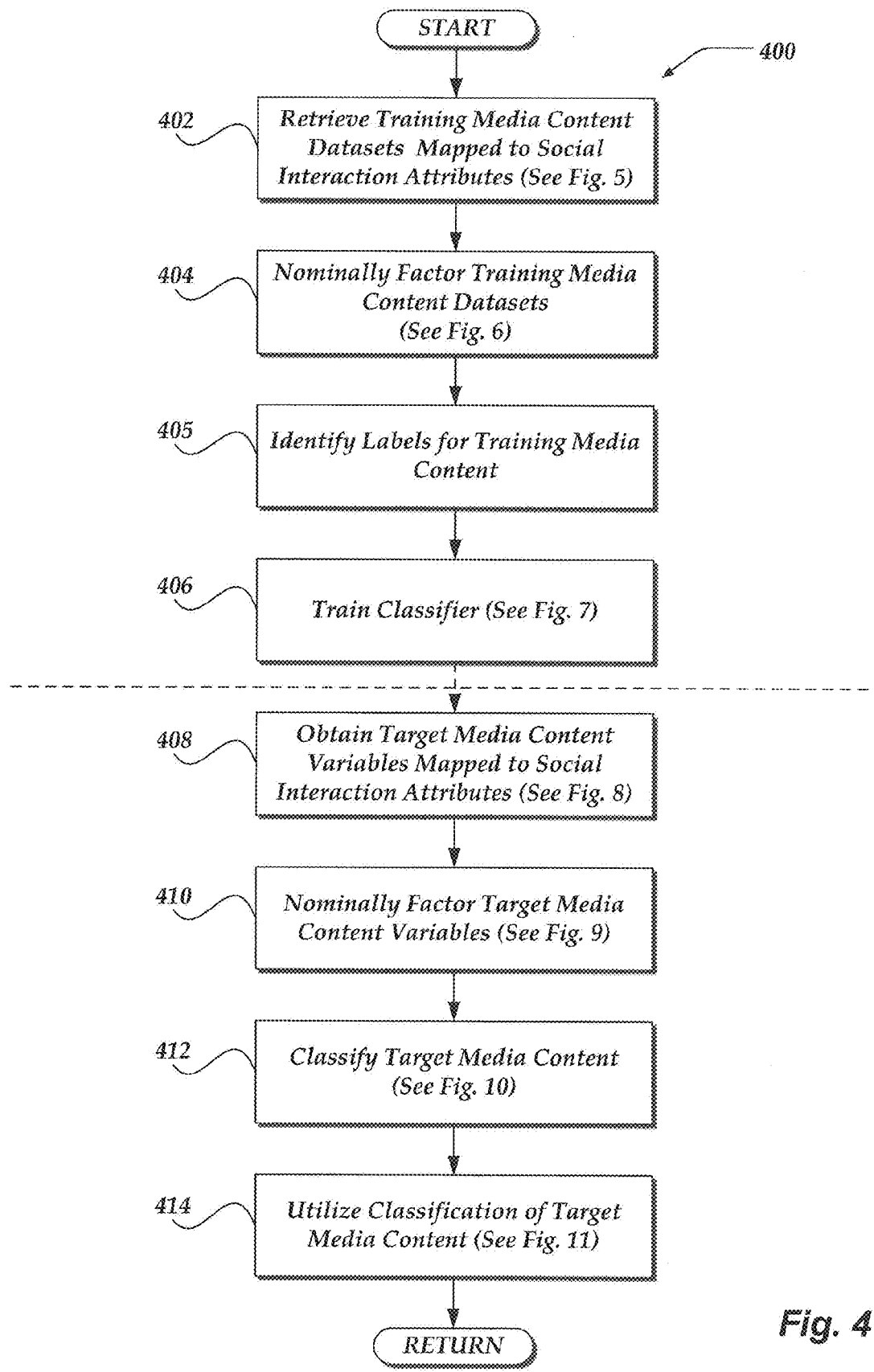
FIG. 4 illustrates a logical flow diagram generally showing one embodiment of an overview process for training and employing a classifier to determine a classification for media content.

The operation of certain aspects of the invention will now be described with respect to FIGS. 4-11. FIG. 4 illustrates a logical flow diagram generally showing one embodiment of an overview process for training and employing a classifier to determine a classification for media content. In some embodiments, process 400 of FIG. 4 may be implemented by and/or executed on a single network device, such as network device 300 of FIG. 3. In other embodiments, process 400 or portions of process 400 of FIG. 4 may be implemented by and/or executed on a plurality of network devices.

In some embodiments, process 400 may be implemented in two modes, an offline mode and an online mode. As used herein, the term "offline mode" refers to activities that may be performed non-real time. In some embodiments, such activities are sometimes referred to as being performed in background mode. However, in other embodiments offline mode refers to activities that are not directly associated with an active or current communication between one or more client devices about media content. The term "online mode" herein refers to activities that are performed directly related to an active or current communication between one or more client devices about media content. Thus, in one embodiment, training of a classifier may be performed in an offline mode, such as in a batch configuration, background mode, or the like. In one embodiment, executing the trained classifier to classify media content is performed in an online mode.

Thus, as illustrated in FIG. 4, blocks 402, 404, 405, and 406 may be performed during an offline mode (as indicated being above the dashed line), while blocks 408, 410, 412, and 414 of FIG. 4 may be performed in an online mode. Moreover, it should be noted that the offline mode training activities and the online mode classification activities may be performed separately. Thus, in one embodiment, the training of the classifier might be performed at a different frequency, than the execution of the online mode classification activities. Similarly, in one embodiment, the training of the classifier, such as blocks 404 and 406, might be performed iteratively.

In any event, process 400 begins, after a start block, at block 402, which is described in more detail below in conjunction with FIG. 5. Briefly, however, at block 402, a plurality of training media content datasets is retrieved from a training media content corpus. In one non-limiting example the dataset may include a video database, where each training media content dataset in the plurality of training media content datasets maps to a different social interaction attribute of the plurality of social interaction attributes. Process 400 then proceeds to block 404, which is described in more detail below in conjunction with FIG. 6. Briefly, however, at block 404, at least one training media content dataset is nominally factored. Process 400 then proceeds to block 405 where labels for the training media content are identified. In some embodiments, the labels may be utilized to provide a ground truth for a classifier. In one embodiment, the labels may be the classification of each training media content file within the training media content corpus. Processing then flows to block 406 which is described in more detail below in conjunction with FIG. 7. Briefly, at block 406, a classifier is trained based on nominally factored training media content datasets and possibly one or more non-factored training media content datasets. In some embodiments, the actions described by blocks 404 and 406 might be executed iteratively.

As noted above, once the classifier is trained, it may then be used one or more times to perform various classification activities as described further below. Thus, as illustrated by the dashed line flow to block 408, processing may flow next to block 408, where a communication is detected, monitored, or otherwise obtained that is about target media content, and from which target media content variables may be obtained that are mapped to social interaction attributes associated with the communication. Block 408 is described in more detail in conjunction with FIG. 8.

Proceeding next to block 410, which is described in more detail below in conjunction with FIG. 9, at least one target media content variable is nominally factored. Flow continues next to block 412, described in more detail in conjunction with FIG. 10, where the trained classifier, from block 406 is executed to determine a classification for the target media content.

Figure 11:
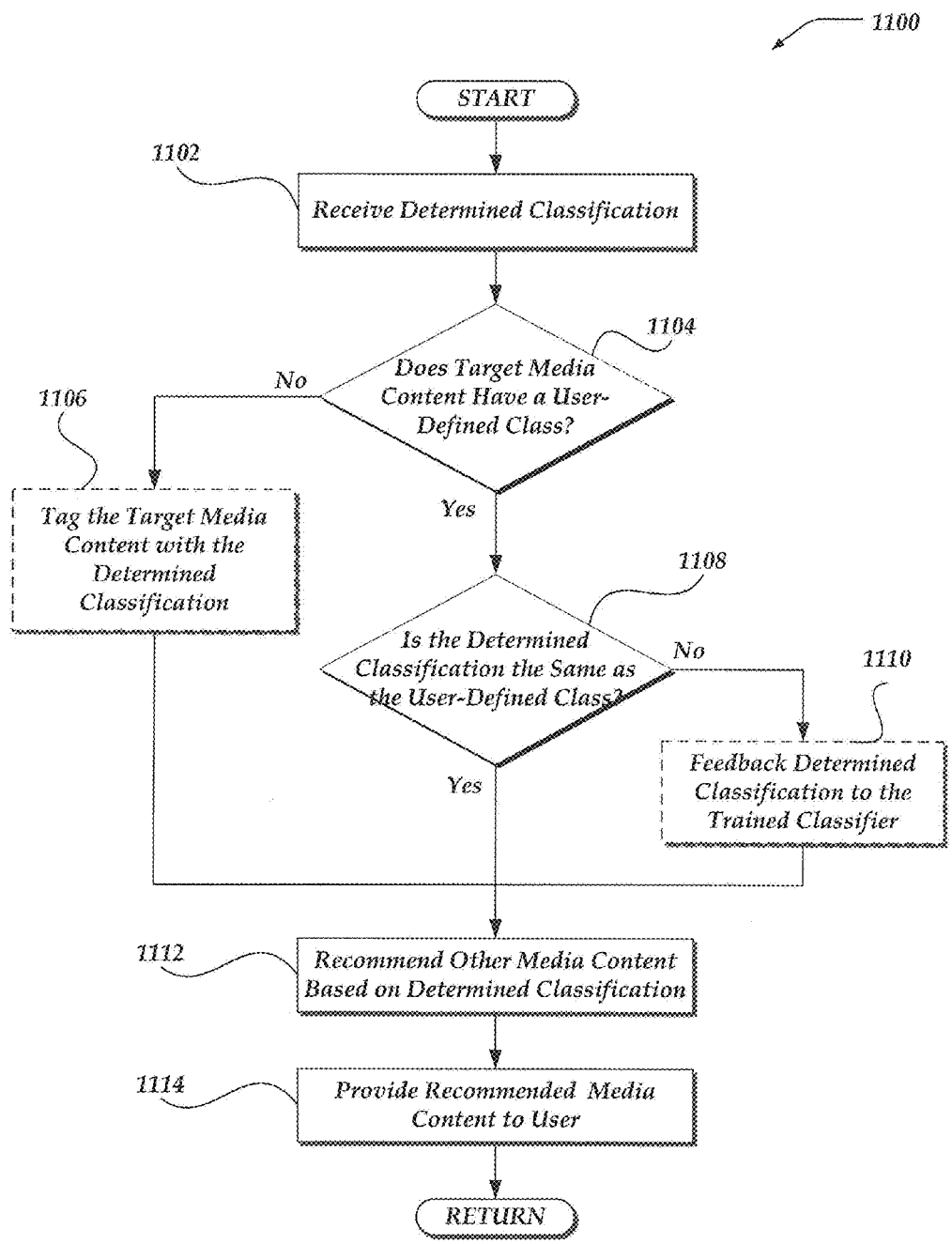
FIG. 11 illustrates a logical flow diagram generally showing one embodiment of a process for utilizing a determined classification for target media content.

Continuing next to block 414, which is described in more detail in conjunction with FIG. 11, a recommendation for additional media content is provided based on the determined classification. Process 400 may then return to a calling process to perform other actions, or as discussed above, processing may loop back to block 408 to classify media content for one or more other communications about media content.

Figure 5:
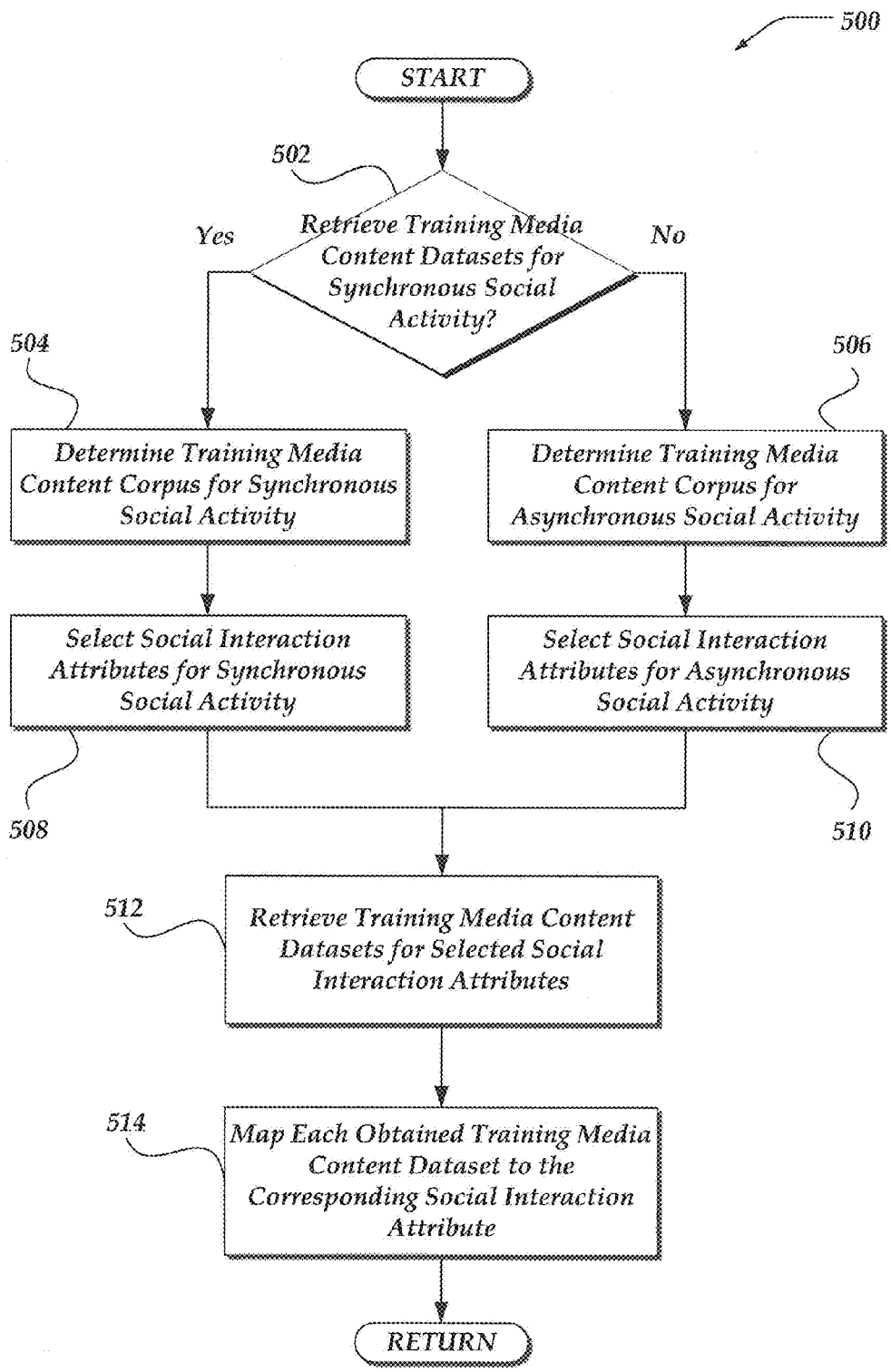
FIG. 5 illustrates a logical flow diagram generally showing one embodiment of a process for retrieving training media content datasets that may be implemented to train a classifier.

FIG. 5 illustrates a logical flow diagram generally showing one embodiment of a process for retrieving training media content datasets that may be implemented to train a classifier.

Process 500 of FIG. 5 begins, after a start block, at decision block 502, where a determination is made whether the retrieved plurality of training media content datasets is about synchronous social activity. If the retrieved plurality of training media content datasets is about synchronous social activity, then processing flows to block 504; otherwise, processing flows to block 506.

At block 504, a training media content corpus concerning synchronous social activity is determined. The training media content corpus includes a collection of media content files, where each media content file is of the same type. In one non-limiting example, the training media content corpus may be a collection of videos, such as a video database.

Along with the collection of media content files, the training media content corpus may also include data corresponding to a plurality of social interaction attributes about synchronous social activity. Each media content file in the training media content corpus may be associated with data corresponding to the plurality of social interaction attributes. In some embodiments, the plurality of social interaction attributes may include implicit usage social interaction attributes. In some embodiments, the plurality of social interaction attributes may include explicit action social interaction attributes. In other embodiments, the plurality of social interaction attributes may include implicit usage and explicit action social interaction attributes.

In one embodiment, the training media content corpus may be determined and not retrieved because the contents of the media content itself are not utilized by a classifier. Rather, data corresponding to the plurality of social interaction attributes about the media content is utilized by the classifier. In some embodiments, the training media content corpus may be determined by an internet crawler. In one embodiment, the internet crawler may determine the training media content corpus from a single database. The internet crawler may determine, in one embodiment, a subset of all the media content within a media content database. In another embodiment, the internet crawler may determine the training media content corpus from a plurality of databases. In other embodiments, the training media content corpus may be determined from a media content database, without using an internet crawler. In one non-limiting example, the training media content corpus may be retrieved from platform event logs.

In another embodiment, the training media content corpus may be determined by observing a plurality of live synchronous social activity sessions during a set period of time. In one embodiment, a session may be a synchronous social activity between two users, where the session is started when one user initiates a shared environment and the session ends when one user terminates the shared environment. In one non-limiting example, the training media content corpus may be retrieved from monitoring the live interactions of platform event users during a time period.

In another embodiment, the training media content corpus may be determined from a historical record for a plurality of synchronous social activity sessions. In one embodiment, the historical record may be a data log or other stored record. In one non-limiting example, the training media content corpus may be determined from a platform event log for a single time period. Determining the training media content corpus is not to be construed as limited to these embodiments, but includes other methods of collecting a data corpus known to those skilled in the art.

In any event, process 500 may then proceed from block 504 to block 508. At block 508, the social interaction attributes about synchronous social activity are selected. The selection of the plurality of social interaction attributes may depend on an availability of data or how the data corresponding to the social interaction attribute was collected, such as implicit usage or explicit action. In one embodiment, only implicit usage social interaction attributes may be selected. In another embodiment, only explicit actions may be selected. Yet, in another embodiment, a combination of implicit usages and explicit action social interaction attributes may be selected.

In some embodiments, all of the plurality of social interaction attributes may be selected. However, in other embodiments, not all of the plurality of social interaction attributes may be selected. In one embodiment, the selection of the plurality of social interaction attributes may be random. In another embodiment, the selection of the plurality of social interaction attributes may be determined by a user.

In one embodiment, the selection of the plurality of social interaction attributes about synchronous social activity may include a session duration, a number of play commands, a number of pause commands, a number of scrub commands (e.g. fast forward and rewind), a number of characters, a number of words, a number of session inviter activities, and a number of session receiver activities. The number of session inviter activities may be a sum of all the actions performed by a user who initiated the synchronous social activity session. The number of session receiver activities may be a sum of all the actions performed by a user who received the synchronous social activity session invite. After block 508, process 500 proceeds to block 512, which is discussed in further detail below.

If the retrieved training media content datasets are not about synchronous social activity, then process 500 may proceed from decision block 502 to block 506. At block 506, a training media content corpus concerning asynchronous social activity is determined. The training media content corpus is a collection of media content files, where each media content file is of the same type. In one non-limiting example the training media content corpus may be a collection of videos, such as a video database.

Along with the collection of media content files, the training media content corpus also contains data corresponding to a plurality of social interaction attributes about asynchronous social activity. Each media content file in the training media content corpus is associated with data corresponding to the plurality of social interaction attributes. In some embodiments, the plurality of social interaction attributes may include implicit usage social interaction attributes. And in some embodiments, the plurality of social interaction attributes may include explicit action social interaction attributes. In other embodiments, the plurality of social interaction attributes may include implicit usage and explicit action social interaction attributes.

In one embodiment, the training media content corpus may be determined and not retrieved because the contents of the media content itself are not utilized by a classifier. Rather, data corresponding to the plurality of social interaction attributes about the media content is utilized by the classifier. In some embodiments, the training media content corpus may be determined by an internet crawler. In one embodiment, the internet crawler may determine the training media content corpus from a single database. The internet crawler may determine, in one embodiment, a subset of all the media content within a media content database. In one non-limiting example, a crawler may be implemented using various applications, such as a YouTube website application programming interface, or the like, to retrieve a training media content corpus of videos from each of a variety of YouTube genre categories. In one embodiment, internet crawler may retrieve the media content for a determined top N YouTube genre categories, where N is greater than two. In another embodiment, the internet crawler may determine the training media content corpus from a plurality of databases. In other embodiments, the training media content corpus may be determined from a media content database, without using an internet crawler. Determining the training media content corpus is not to be construed as limited to these embodiments, but includes other methods of collecting a data corpus known to those skilled in the art.

Process 500 then proceeds from block 506 to block 510. At block 510, the plurality of social interaction attributes about asynchronous social activity are selected. The selection of the plurality of social interaction attributes may depend on the availability of data or how the data corresponding to the social interaction attribute was collected, such as implicit usage or explicit action. In one embodiment, only implicit usage social interaction attributes may be selected. In another embodiment, only explicit actions may be selected. Yet, in another embodiment, a combination of implicit usages and explicit action social interaction attributes may be selected. In one embodiment, the selection of the plurality of social interaction attributes about asynchronous social activity includes a user generated rating, a view count, and a media content duration.

In some embodiments, all of the plurality of social interaction attributes may be selected. However, in other embodiments, not all of the plurality of social interaction attributes may be selected. In one embodiment, the selection of the plurality of social interaction attributes may be random. In another embodiment, the selection of the plurality of social interaction attributes may be determined by a user.

From block 508 and block 510, process 500 proceeds to block 512 where a plurality of training media content datasets is retrieved from the data in the training media content corpus. Each training media content dataset in the plurality of training media content datasets corresponds to a different social interaction attribute of the plurality of social interaction attributes. In one non-limiting example, a training media content dataset is retrieved for user generated ratings for all the media content files in the training media content corpus. In this non-limiting example, the "ratings" is the social interaction attribute. In some embodiments, the training media content datasets are retrieved from media content metadata. In other embodiments, the training media content datasets are retrieved from a storage media that maintains the all the data corresponding to social interaction attributes. In one embodiment, the training media content datasets are retrieved from a storage media that maintains the all the data corresponding to social interaction attributes, but not the media content itself.

Process 500 then proceeds to block 514. At block 514, each training media content dataset in the plurality of training media content datasets corresponds to a different social interaction attribute of the plurality of social interaction attributes. The mapping maintains a relationship between the each of the plurality of training media content datasets and the corresponding social interaction attribute of the plurality of social interaction attributes. In one non-limiting example, the dataset containing all the user generated rating values, such as 1.2, 4.1, 5.0, 5.0, etc., is mapped to the social interaction attribute "ratings." In some embodiments, the mapping may be implemented as a table. In one embodiment, each row corresponds to a different social interaction attribute and each column corresponds to a different media content file within the training media content corpus. In one non-limiting example, row one, may contain all the "ratings" values and column one may contain all the data corresponding to the social interaction attributes for "video 1."

In other embodiments, the mapping may be implemented as a plurality of tables. In one embodiment, each table represents a single social interaction attribute, where each row represents a unique value within the training media content dataset, column one contains all of the unique values, and column two contains the frequency that each unique value occurs in the training media content corpus. In other embodiments, each dataset may be maintained as an individual array, where each array represents a different social interaction attribute and each element of the array represents data from a different media content file. In one non-limiting example, the array "ratings" may contain the user generated rating values of all videos in a training corpus, where the elements of the array are individual user generated ratings, such as 1.2, 4.1, 5.0, 5.0, etc. After block 514, process 500 returns to a calling process to perform other actions.

Figure 6:
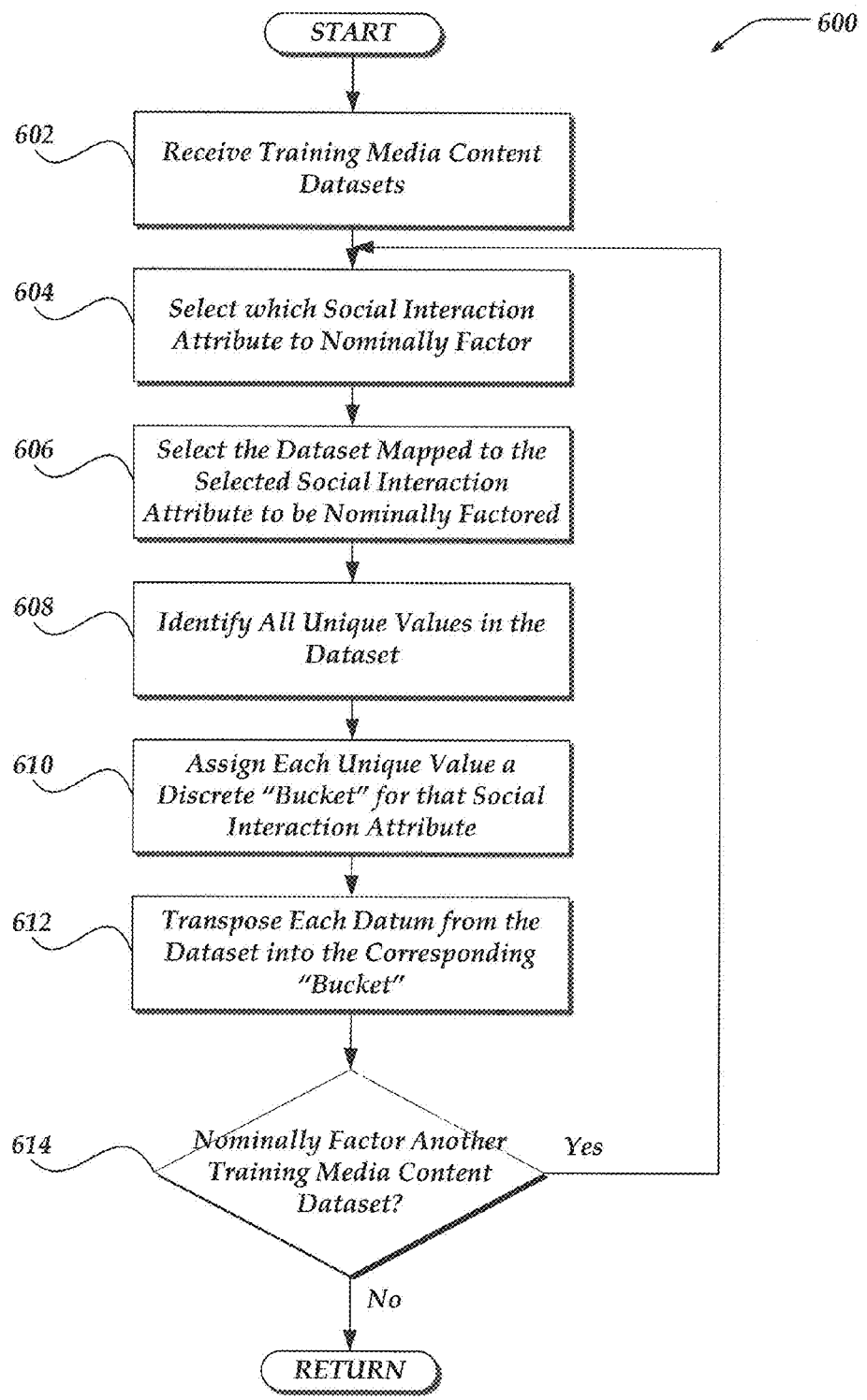
FIG. 6 illustrates a logical flow diagram generally showing one embodiment of a process for nominally factoring training media content datasets.

FIG. 6 illustrates a logical flow diagram generally showing one embodiment of a process for nominally factoring training media content datasets. In some embodiments, nominally factoring training media content datasets may derive a performance increase in a classifier. Process 600 of FIG. 6 begins, after a start block, a block 602. At block 602, the training media content datasets are received.

Process 600 then proceeds to block 604 where at least one of the plurality of social interaction attributes to be nominally factored may be selected. In one embodiment, a plurality of the plurality of social interaction attributes social interaction attributes may be selected for the corresponding data to be nominally factored. In some embodiments, the selection of the at least one of the plurality social interaction attributes may be random. In other embodiments, the selection of the at least one of the plurality social interaction attributes may be determined by a user.

In some embodiments, the at least one of the plurality social interaction attributes may be selected based on how the data corresponding to the at least one of the plurality of social interaction attribute was collected, such as implicit usage or explicit action. In one embodiment, only implicit usage social interaction attributes may be selected. In another embodiment, only explicit actions may be selected. Yet, in another embodiment, a combination of implicit usages and explicit action social interaction attributes may be selected. In one embodiment, the at least one of the plurality of social interaction attributes may be selected for the corresponding data to be nominally factored may be the "ratings" social interaction attribute. In another embodiment, the at least one of the plurality of social interaction attributes may be selected for the corresponding data to be nominally factored may be a number of play commands, a number of pause commands, a number of scrub commands (e.g. fast forward and rewind), and a synchronous social activity session duration.

The selection of the at least one of the plurality of social interaction attributes for the corresponding data to be nominally factored may be based on whether the at least one of the plurality of social interaction attribute may be an implicit usage or an explicit action. In one embodiment, only implicit usage social interaction attributes may be selected. In another embodiment, only explicit actions may be selected. Yet, in another embodiment, a combination of implicit usage and explicit action social interaction attributes may be selected.

Processing next to block 606, at least one of the plurality of training media content dataset that is mapped to the selected at least one of the plurality of social interaction attributes is selected. Nominal factoring typically employs numerical values. Thus, the training media content datasets and not the social interaction attribute are typically nominally factored. However, numerical values might be assigned to the social interaction attributes, such that they may be factored. In any event, at least one of the plurality of training media content dataset itself is selected for nominal factoring based on the mapping to the selected at least one of the plurality of social interaction attribute.

Process continues to block 608, where all unique values within the selected at least one of the plurality of training media content dataset are identified. In one embodiment, each unique value within the selected at least one of the plurality of training media content dataset may be recorded as an array.

Continuing to block 610, each unique value in the selected at least one of the plurality of training media content dataset is assigned a discrete, unordered "bucket." When a unique value is assigned a "bucket" it is transposed into that "bucket." This transposition redefines the unique value as a "bucket" reference value. Each "bucket" has a numerical reference number. In one embodiment, each "bucket" reference value may be a discrete positive integer. Each unique value is assigned a discrete "bucket," such that the total number of "buckets" equals the total number of unique values in selected at least one of the plurality of training media content dataset. In one non-limiting example, a unique user generated rating value of 4.1 may be transposed into "bucket 2," where the "bucket 2" reference value is 2. Thus, in this non-limiting example, the unique value of 4.1 is transposed to 2.

The "bucket" reference value may be unrelated to the unique value assigned to that "bucket." Rather, the "buckets" are referenced by a numerical value for use in a classifier. Similarly, the "buckets" do not have a mathematical ordering, which in turn removes any ordering between the unique values when the unique values are transposed into the "buckets." In one non-limiting example, assume a unique user generated rating value 2.0 is transposed to "bucket 1" and a unique user generated rating value 4.1 is transposed to "bucket 2." Since the "buckets" are unordered, "bucket 1" is not a smaller value or less important than "bucket 2," nor is there any mathematical difference between the unique values in the "buckets." The important aspect is that unique user generated rating value 2.0 is different than unique user generated rating value 4.1, which is accomplished by transposing each unique value into discrete unordered "buckets."

Process 600 then proceeds to block 612 where each datum in the selected at least one of the plurality of training media content datasets is transposed into the corresponding "bucket." Each datum in the selected at least one of the plurality of training media content datasets is transposed into the "bucket" whose unique value is equal to the datum value. Thus, each datum is redefined as the transposed "bucket" reference value.

In some embodiments, each data item may be changed to the corresponding "bucket" reference and a separate mapping is maintained between the "bucket" reference and the unique value. In other embodiments, each "bucket" may contain three pieces of information: 1) the unique value assigned to that "bucket," 2) the "bucket" reference, and 3) the frequency the unique value occurs in the at least one of the plurality of training media content datasets. In one embodiment, each "bucket" may be maintained as an array with the "bucket" reference as an element, the unique value as an element, and the frequency as an element. In one embodiment, each nominally factored dataset may be maintained as a table where each row is a "bucket," one column contains the "bucket" reference, one column contains the unique value, and one column contains the frequency of the unique value in the at least one of the plurality of training media content datasets.

Process 600 then proceeds to decision block 614 where a determination is made whether to nominally factor the another one of the plurality of training media content datasets mapped to another one of the plurality of social interaction attributes. In some embodiments, only one of the plurality of training media content dataset may be nominally factored. In one embodiment, about asynchronous social activity, only the training media content dataset may be mapped to a user generated rating social interaction attribute is nominally factored. In other embodiments, a plurality of the plurality of training media content datasets may be nominally factored. If it is determined that another one of the plurality of training media content datasets are to be nominally factored, processing loops back to block 604; otherwise, processing returns to a calling process.

Figure 7:
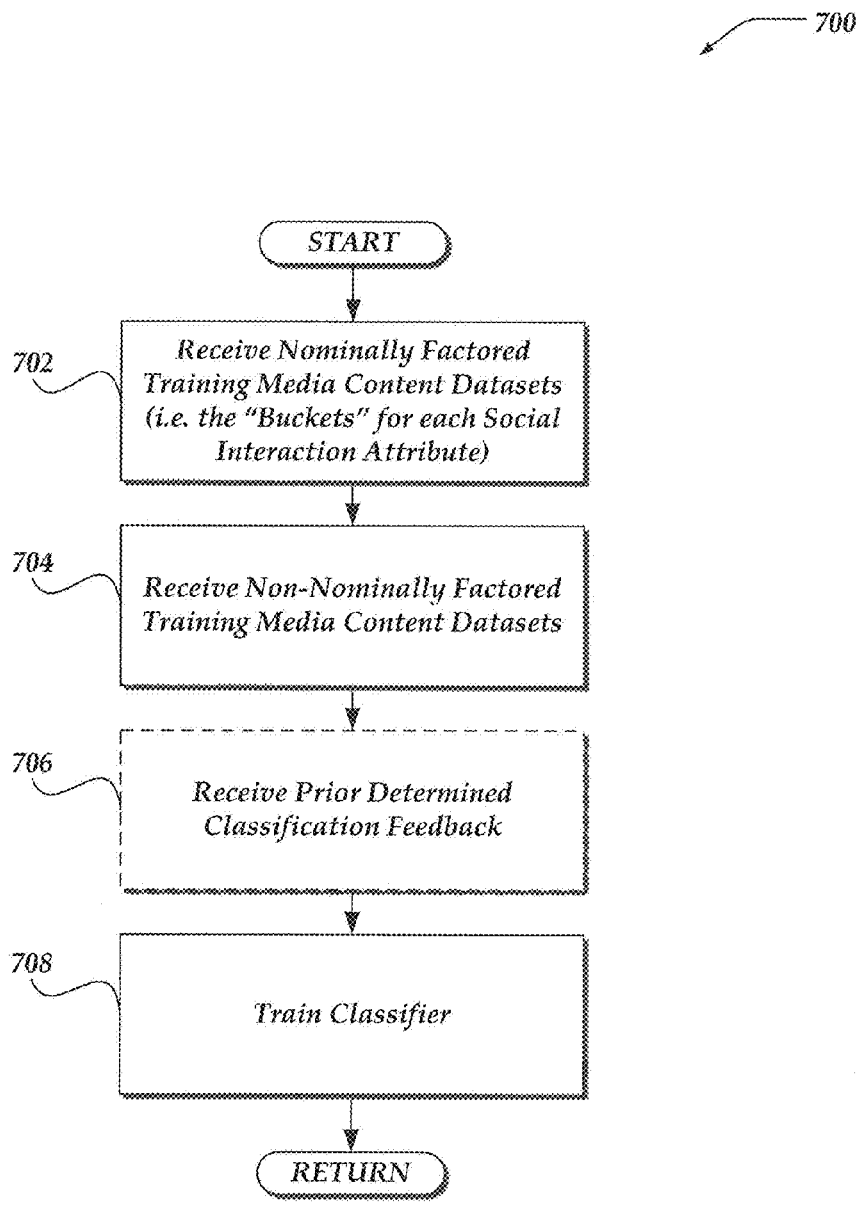
FIG. 7 illustrates a logical flow diagram generally showing one embodiment of a process for training a classifier.

FIG. 7 illustrates a logical flow diagram generally showing one embodiment of a process for training a classifier. Process 700 of FIG. 7 begins, after a start block, at block 702 where the at least one nominally factored training media content dataset is received. In some embodiments, the received at least one nominally factored training media content dataset may contain "bucket" references and corresponding frequencies. The frequencies indicating how many times a unique value occurred in the at least one nominally factored training media content dataset.

Process 700 then proceeds to block 704 where non-nominally factored training media content datasets are received. In some embodiments, the received non-nominally factored training media content datasets may contain the data retrieved from the training media content corpus. In other embodiments, the received non-nominally factored training media content datasets may contain unique values and the frequency of the unique value in the training media content dataset.

Process 700 may then proceed in some embodiments to optional block 706. At optional block 706, a prior determined classification is received to allow for feedback to retrain the classifier. After a classifier is trained, the trained classifier may be executed on one or more target media content. Each trained classifier execution results in a determined classification output. The output may then be utilized to retrain the classifier. In one embodiment, the trained classifier accepts the determined classification output as an input parameter to retrain the classifier.

Process 700 then proceeds to block 708. At block 708, a classifier is trained. Each of the plurality of training media content datasets is utilized by the classifier as an input parameter to train the classifier. The classifier may be any kind of classifier, including, but not limited to Naïve Bayes classifier, decision trees, support vector machine, or the like. After block 708, process 700 returns to a calling process.

Figure 8:
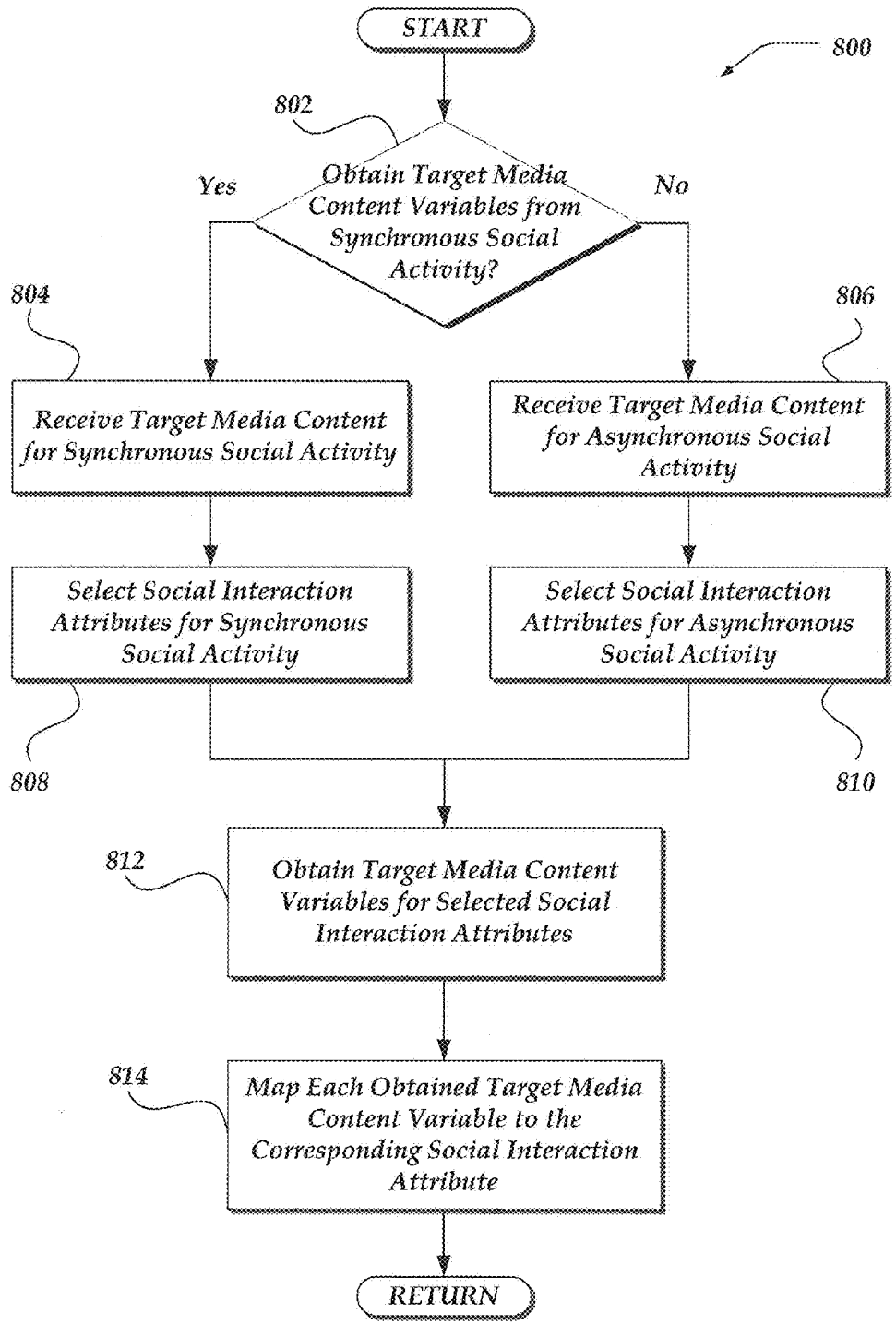
FIG. 8 illustrates a logical flow diagram generally showing one embodiment of a process for obtaining target media content to be classified.

FIG. 8 illustrates a logical flow diagram generally showing one embodiment of a process for obtaining target media content to be classified. Process 800 of FIG. 8 begins, after a start block, at decision block 802 where it is determined whether the plurality of target media content variables is obtained about synchronous social activity. The outcome of decision block 802 is dependent on the same social activity for training the classifier, such as the outcome of decision block 502 of FIG. 5. In one non-limiting example, if the retrieved training media content datasets are about synchronous social activity, then the obtained target media content variables may also be about synchronous social activity. This dependency arises from the need to keep the characteristics of the classifier input data the same as the characteristics used to train the classifier. In one non-limiting example, a classifier that is trained to classify fruit as an apple or an orange based on a diameter and a weight characteristic cannot accept a color characteristic as an input because it is not trained to utilize color.

If, at decision block 802, the obtained plurality of target media content variables is about synchronous social activity, then process 800 proceeds to block 804. At block 804, the target media content concerning synchronous social activity is determined. The target media content is determined by detecting a communication of the target media content. In one embodiment, the communication is detected with a network device, such as network device 300 of FIG. 3. A communication is detected when the target media content is shared or experienced by one or more users. In one embodiment, the detected communication may be a user accessing the media content while in a synchronous social activity session. In another embodiment, the detected communication may be a user initiating a request to classify a target media content based on historic synchronous social activity. As noted above, the communication may also be a monitored communication, such as might arise when communications with a network device is being monitored. For example, communications with content service device 109 that are associated with media content might be monitored.

In any event, processing continues to block 808 from block 804, where social interaction attributes about synchronous social activity are selected. The selection is dependent on the same selection of social interaction attributes for training the classifier, such as the selection of block 508 of FIG. 5. In one non-limiting example, if a play command count, a scrub count, and a session duration are selected to train the classifier, then the play command count, the scrub count, and the session duration may also be selected for implementing the trained classifier. Again, this dependency provides that the characteristics used as input to the trained classifier are the same as the characteristics used to train the classifier. After block 808, process 800 proceeds from block 808 to block 812, which is discussed in further detail below.

If, at decision block 802, the obtained plurality of target media content variables is not about synchronous social activity, then process 800 proceeds from block 802 to block 806. At block 806, target media content concerning asynchronous social activity is determined. The target media content is determined by detecting a communication of a target media content. In one embodiment, the communication is detected with a network device, such as network device 300 of FIG. 3. A communication is detected when the target media content is shared or experienced by one or more users. In one embodiment, the detected communication may be a user accessing the target media content, such as viewing the target media content, downloading the target media content, or the like. In another embodiment, the detected communication may be a user initiating a request to classify the target media content based on historic asynchronous social activity. Again, the communication may also be a monitored communication that is associated with media content.

Process 800 then proceeds to block 810. At block 810, social interaction attributes about asynchronous social activity are selected. The selection of block 810 is dependent on the same selection of social interaction attributes for training the classifier, such as the selection of block 510 of FIG. 5. In one non-limiting example, if a user generated rating, a duration, and a view count are selected to train the classifier, then the user generated rating, the duration, and the view count may also be selected for implementing the trained classifier.

From block 808 and block 810, process 800 proceeds to block 812. At block 812, the plurality of target media content variables is obtained from the target media content. Each target media content variable corresponds to a different social interaction attribute. In some embodiments, the plurality of target media content variables may be obtained from target media content metadata. In other embodiments, the plurality of target media content variables may be obtained from a storage media, which maintains the plurality of target media content variables but not the media content itself. In one embodiment, the plurality of target media content variables may be observed from a social activity and stored separate from the target media content.

Process 800 then proceeds to block 814. At block 814, each target media content variable may be mapped to the corresponding social interaction attribute. The mapping maintains a relationship between the media content variable and the corresponding social interaction attribute. In one non-limiting example, the target media content user generated rating value 4.1 is mapped to the social interaction attribute "ratings." In some embodiments, the mapping may be implemented by using a single array for all target media content variables, where each element of the array corresponds to a different social interaction attribute. In other embodiments, each target media content variable is stored as a separate variable, where each variable corresponds to a different social interaction attribute. After block 814, process 800 returns to a calling process.

Figure 9:
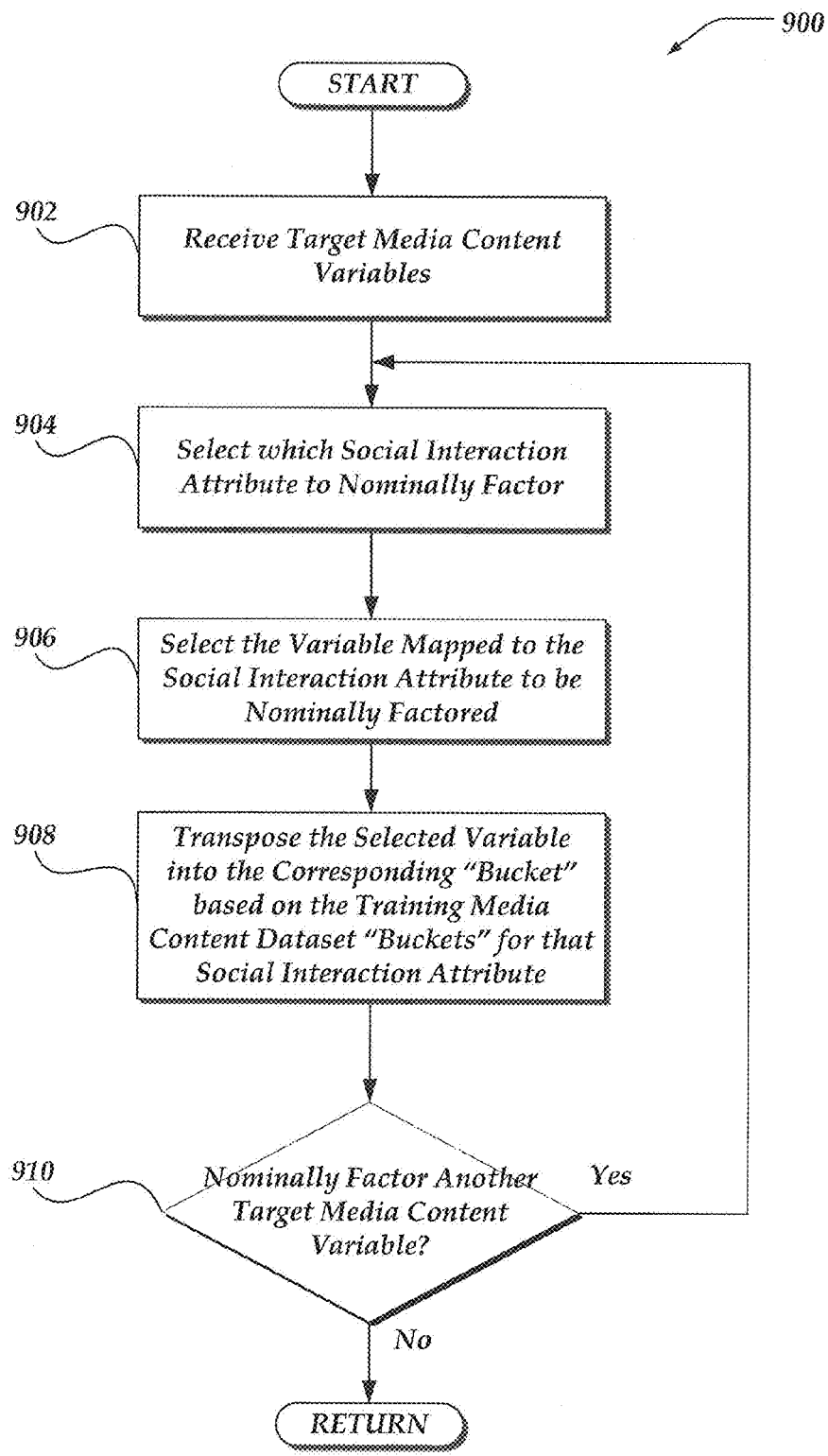
FIG. 9 illustrates a logical flow diagram generally showing one embodiment of a process for nominally factoring training media content variables.

FIG. 9 illustrates a logical flow diagram generally showing one embodiment of a process for nominally factoring target media content variables. In some embodiments, nominally factoring target media content variables may derive a performance increase in a classifier. Process 900 of FIG. 9 begins, aster a start block, at block 902, where the plurality of target media content variables is received. Continuing next to block 904, a social interaction attribute that is nominally factored may be selected. The selection may be dependent on the same social interaction attribute selected to be nominally factored for training the classifier. In one non-limiting example, if a user generated rating social interaction attribute was selected to be nominally factored to train a classifier, the user generated rating social interaction attribute may also be selected to be nominally factored.

Process 900 then proceeds to block 906 where one of the plurality of target media content variable that is mapped to the selected social interaction attribute is selected. Proceeding next to block 908, the selected target media content variable is transposed into a corresponding "bucket." The corresponding "bucket" is based on the discrete "buckets" that are defined by nominally factoring the training media content datasets. Thus, the selected target media content variable is redefined as the transposed "bucket" reference value. In one non-limiting example, if the training media content dataset mapped to "ratings" is nominally factored and a user generated rating value of 4.1 is transposed into "bucket 2," which has a "bucket" reference value of 2, then a target media content variable with the user generated rating value of 4.1 will also be transposed into "bucket 2."

Process 900 then proceeds to decision block 910 where a determination is made whether to nominally factor another target media content variable. If so, then processing loops back to block 904; otherwise, processing returns to a calling process.

Figure 10:
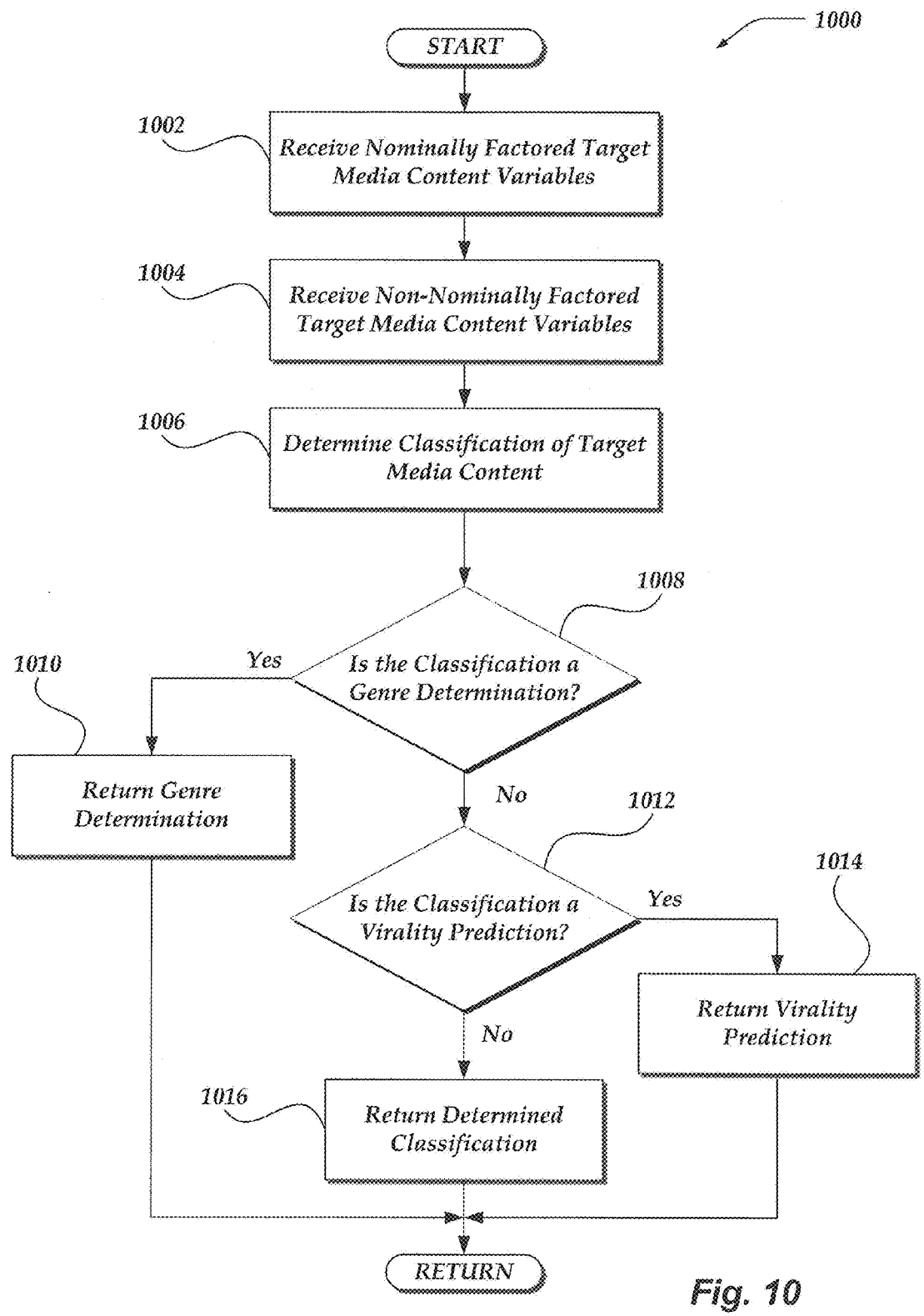
FIG. 10 illustrates a logical flow diagram generally showing one embodiment of a process for employing a classifier to classify a target media content.

FIG. 10 illustrates a logical flow diagram generally showing one embodiment of a process for employing a classifier to classify a target media content. Process 1000 of FIG. 10 begins, after a start block, at block 1002 where, the at least one nominally factored target media content variables is received. Process 1000 then proceeds to block 1004 where the non-nominally factored target media content variables are received.

Continuing to block 1006, the trained classifier determines a classification for the target media content by providing the plurality of target media content variables to a trained classifier, such as the trained classifier shown by process 700 of FIG. 7. To determine the classification, the trained classifier is executed using the at least one nominally factored target media content variables and the non-nominally factored target media content variables as inputs to the trained classifier. The output from the execution of the trained classifier is the determined classification. In one embodiment, the classifier determination may be a single classification. In another embodiment, the classifier determination may be an output of all possible classification determinations and a probability for each possible classification determination. In another embodiment, the classifier determination may be a yes/no determination. In one embodiment, the classifier may determine a genre of the target media content, such as but not limited to comedy, sports, news, music, people, entertainment, film, or the like. In another embodiment, the classifier may determine a virality prediction. The virality prediction provides a determination as to whether the target media content will go viral or not.

Process 1000 then proceeds to decision block 1008. At decision block 1008, a decision is made whether the determined classification by the classifier is a genre determination. If, at decision block 1008, the determined classification is a genre determination, then process 1000 proceeds from decision block 1008 to block 1010. At block 1010, the genre determination is returned. In one embodiment, the returned genre determination may be a single genre. In another embodiment, the returned genre determination may be all possible genres and a probability for each possible genre. After block 1010, process 1000 returns to a calling process.

If, at decision block 1008, the determined classification is not a genre determination, then process 1000 proceeds from decision block 1008 to decision block 1012. At decision block 1012, a decision is made whether the determined classification by the classifier is a virality prediction.

If, at decision block 1012, the determined classification is a virality prediction, then process 1000 proceeds from decision block 1012 to block 1014. At block 1014, the virality prediction is returned. In one embodiment, the virality prediction may return a yes or no determination. In another embodiment, the virality prediction may return a probability of the target media content going viral. After block 1014, process 1000 returns to a calling process.

If, at decision block 1012, the determined classification is not a virality prediction, then process 1000 proceeds from decision block 1012 to block 1016. At block 1016, the determined classification is returned. In some embodiments, the determined classification may be any type of classification based on a user defined classification system. In some embodiment, the returned determined classification may be a single classification. In other embodiments, the returned determined classification may be all possible classifications and a probability for each possible classification. After block 1016, process 1000 returns to a calling process.

FIG. 11 illustrates a logical flow diagram generally showing one embodiment of a process for utilizing a determined classification for target media content. Process 1100 of FIG. 11 begins, after a start block, at block 1102, where the determined classification is received from the trained classifier output.

Proceeding to decision block 1104 a determination is made whether the target media content has a user-defined classification. The user-defined classification is a classification for the target media content that may be generated by a user and is associated with the target media content. In one embodiment, the user-defined classification may be the classification that is provided by the creator of the target media content. In another embodiment, the user-defined classification may be provided by the original uploader of the target media content. In another embodiment, the user-defined classification may be provided during or after the target media content is experienced by the user. In one non-limiting example, after a user is finished watching a video, the video player may prompt the user to select the classification for the video that the user just finished watching. In some embodiments, the user-defined classification may be contained in target media content metadata. In other embodiments, the user-defined classification may be stored in an electronic medium separate from the target media content.

If, at decision block 1104, the target media content does not have a user-defined classification, then process 1100 may proceed in some embodiments from decision block 1104 to optional block 1106. At optional block 1106, the target media content is tagged with the determined classification. Tagging target media content with the determined classification creates an association between the target media content and the determined classification. In one embodiment, target media content metadata may contain the determined classification tag. In another embodiment, the determined classification tag may be stored in a storage media with a link to the media content. After option block 1106, process 1100 proceeds from option block 1106 to block 1112, which is discussed in further detail below.

If, at decision block 1104, the target media content has a user-defined classification, then process 1100 proceeds from decision block 1104 to decision block 1108. At decision block 1108, a decision is made whether the determined classification is the same as the user-defined classification of the target media content.

If, at decision block 1108, the user-defined classification of the target media content is not the same as the determined classification, then process 1100 may proceed in some embodiments from decision block 1108 to option block 1110. At option block 1110, the determined classification may be provided to the classifier to employ the classification as a feedback to retrain the classifier. After a classifier is trained, the trained classifier may be executed on one or more target media content. Each trained classifier execution results in a determined classification output. The output may then be utilized to retrain the classifier. In one embodiment, the trained classifier accepts the determined classification output as an input parameter to retrain the classifier. After option block 1110, process 1100 proceeds from option block 1110 to block 1112, which is discussed in further detail below.

If, at decision block 1108, the user-defined classification of the target media content is the same as the determined classification, then process 1100 proceeds from decision block 1108 to block 1112. At block 1112, another media content file is recommended based on the determined classification. In some embodiments, the recommended media content and the target media content may be of the same class. In one non-limiting example, if the determined classification is the genre comedy, then another comedy video is recommended. In other embodiments, the recommended media content and the target media content may not be of the same class.

Process 1114 then proceeds to block 1114. At block 1114, the recommended media content is provided to a user. In one embodiment, the recommended media content may be provided to the user as a link. In another embodiment, the recommended media content may be provided to the user as an option to experience additional media content. In one non-limiting example, the user may be prompted with a yes/no question whether the user wants to view additional videos that are the same class as the video that the user just finished viewing. In one embodiment, the recommended media content may be downloaded onto the client device, such as client device 200 of FIG. 2.

In some embodiments, the recommended media content may be automatically provided to the user. In other embodiments, the recommended media content may not be automatically provided to the user. Rather, the user has the ability to "turn-off" recommended media content. After block 1114, process 1100 returns to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method operating on one or more network devices, comprising:
   detecting a communication about a target media content;
   obtaining a plurality of target media content variables that map to one or more social interaction attributes associated with the communication;
   nominally factoring at least one of the plurality of target media content variables; and
   determining a classification for the target media content by providing the plurality of target media content variables, including the nominally factored target media content variable, to a classifier trained using at least one nominally factored training media content dataset that maps to at least one training social interaction attribute.

2. The method of claim 1, further comprising:
   employing the classification to provide to at least one client device associated with the detected communication at least one other media content based on the determined classification.

3. The method of claim 1, wherein the at least one nominally factored target media content variable and the at least one nominally factored training media content dataset further comprises nominally factoring an implicit usage social interaction attribute.

4. The method of claim 1, further comprising:
   obtaining the training media content dataset from a plurality of asynchronous social activities or synchronous social activities.

5. The method of claim 1, further comprising:
   obtaining the plurality of target media content variables from a synchronous social activity or asynchronous social activity associated with the communication.

6. The method of claim 1, wherein the determined classification further includes a prediction of whether the target media content will go viral.

7. The method of claim 1, wherein the classifier further comprises a Naïve Bayes classifier.

8. A network device, comprising:
   a transceiver for communicating with at least one client device over a network;
   a processor for enabling actions, the actions comprising:
      monitoring a communication about a target media content;
      obtaining a plurality of target media content variables that map to one or more social interaction attributes associated with the communication;
      nominally factoring at least one of the plurality of target media content variables;
      determining a classification for the target media content by providing the plurality of target media content variables, including the nominally factored target media content variable, to a classifier trained using at least one nominally factored training media content dataset that maps to at least one training social interaction attribute; and
      providing a recommendation of at least a second media content based on the determined classification.

9. The network device of claim 8, wherein the processor further enables actions, comprising:
   employing the classification to enable a search for at least another media content.

10. The network device of claim 8, wherein the at least one nominally factored target media content variable and the at least one nominally factored training media content dataset further comprises nominally factoring an implicit usage social interaction attribute.

11. The network device of claim 8, wherein the processor further enables actions, comprising:
   obtaining the training media content dataset from a plurality of asynchronous social activities or synchronous social activities.

12. The network device of claim 8, wherein the processor further enables actions, comprising:
   obtaining the plurality of target media content variables from a synchronous social activity or asynchronous social activity associated with the communication.

13. The network device of claim 8, wherein the determined classification further includes a prediction of whether the target media content will go viral.

14. The network device of claim 8, wherein the classifier further comprises a Naïve Bayes classifier.

15. A system for classifying media content, comprising:
   at least one network device that manages a communications over a network; and
   one or more other network devices that are configured to perform actions, including:

monitoring a communication about a target media content;

obtaining a plurality of target media content variables that map to one or more social interaction attributes associated with the communication;

nominally factoring at least one of the plurality of target media content variables; and determining a classification for the target media content by providing the plurality of target media content variables, including the nominally factored target media content variable, to a classifier trained using at least one nominally factored training media content dataset that maps to at least one training social interaction attribute.

16. The system of claim 15, wherein the one or more other network devices further enables actions, comprising:

employing the classification to provide to at least one client device associated with the communication at least one other media content based on the determined classification.

17. The system of claim 15, wherein the at least one nominally factored target media content variable and the at least one nominally factored training media content dataset further comprises nominally factoring an implicit usage social interaction attribute.

18. The system of claim 15, wherein the one or more other network devices further enables actions, comprising:

obtaining the training media content dataset from a plurality of asynchronous social activities or synchronous social activities.

19. The system of claim 15, wherein the one or more other network devices further enables actions, comprising:

obtaining the plurality of target media content variables from a synchronous social activity or asynchronous social activity associated with the communication.

20. The system of claim 15, wherein the determined classification further comprises one of a virality prediction or a genre determination.

* * * * *